US012094640B2

(12) United States Patent
Yang

(10) Patent No.: US 12,094,640 B2
(45) Date of Patent: Sep. 17, 2024

(54) RESONANT TRANSFORMER STRUCTURE WITH HIGH LEG POSITION

(71) Applicant: YU JING TECHNOLOGY CO., LTD., Taoyuan (TW)

(72) Inventor: Sen-Tai Yang, Taoyuan (TW)

( * ) Notice: Subject to any disclaimer, the term of this patent is extended or adjusted under 35 U.S.C. 154(b) by 631 days.

(21) Appl. No.: 17/401,700

(22) Filed: Aug. 13, 2021

(65) Prior Publication Data

US 2022/0076877 A1 Mar. 10, 2022

(30) Foreign Application Priority Data

Sep. 8, 2020 (TW) ................................ 109130747

(51) Int. Cl.
*H01F 5/02* (2006.01)
*H01F 27/24* (2006.01)
*H01F 27/28* (2006.01)

(52) U.S. Cl.
CPC ......... *H01F 27/2823* (2013.01); *H01F 27/24* (2013.01)

(58) Field of Classification Search
CPC .... H01F 27/2823; H01F 27/24; H01F 27/303; H01F 27/325; H01F 5/02; H01F 2005/022; H01F 2005/025; H01F 5/027; H01F 5/04; H01F 2005/043; H01F 2005/046; H01F 5/06; H01F 2027/297; H01F 27/323; H01F 27/324
See application file for complete search history.

(56) References Cited

U.S. PATENT DOCUMENTS

| | | | | | |
|---|---|---|---|---|---|
| 4,716,394 | A * | 12/1987 | Gordon | H01F 27/325 | 336/198 |
| 5,015,984 | A * | 5/1991 | Vialaneix | H01F 5/02 | 336/197 |
| 5,200,731 | A * | 4/1993 | Tochio | H01F 27/324 | 336/98 |
| 5,534,839 | A * | 7/1996 | Mackin | H01F 27/266 | 336/198 |

(Continued)

FOREIGN PATENT DOCUMENTS

| | | |
|---|---|---|
| TW | I463508 B | 12/2014 |
| TW | I575542 B | 3/2017 |
| TW | I695393 B | 6/2020 |

*Primary Examiner* — Mang Tin Bik Lian
(74) *Attorney, Agent, or Firm* — Ying-Ting Chen; Law Office of Michael Chen

(57) ABSTRACT

A resonant transformer structure includes a secondary wire bracket having a secondary wire groove, and a primary wire bracket having a primary wire groove. The secondary wire bracket is provided with two third wire holders each having multiple auxiliary legs. The primary wire bracket has a fourth wire holder having multiple connecting legs. The primary wire bracket has multiple jump wire gaps. A secondary winding is wound in the secondary wire groove. A primary winding is wound in the primary wire groove. The primary wire bracket extends into the secondary wire bracket. The wire end of the secondary winding does not pass the primary winding. The wire end of the primary winding extends through the jump wire gaps, and is connected to the connecting legs to increase a distance between the wire end of the secondary winding and the primary winding.

10 Claims, 6 Drawing Sheets

(56) References Cited

U.S. PATENT DOCUMENTS

| | | | | |
|---|---|---|---|---|
| 7,830,234 | B1 * | 11/2010 | Tien | H01F 27/326 336/198 |
| 8,643,459 | B2 * | 2/2014 | Eom | H01F 27/29 336/208 |
| 8,698,586 | B2 * | 4/2014 | Park | H05B 41/02 336/192 |
| 9,437,360 | B2 | 9/2016 | Yang | |
| 2007/0246594 | A1 * | 10/2007 | Pan | H01F 21/04 242/474.4 |
| 2013/0176097 | A1 * | 7/2013 | Yamada | H01F 30/06 336/220 |
| 2015/0302979 | A1 * | 10/2015 | Yang | H01F 27/025 336/59 |

* cited by examiner

RESONANT TRANSFORMER STRUCTURE WITH HIGH LEG POSITION

BACKGROUND OF THE INVENTION

1. Field of the Invention

The present invention relates to a resonant transformer structure with a high leg position and, more particularly, to a simplified layout of a printed circuit board (PCB).

2. Description of the Related Art

A conventional transformer comprises a primary coil (or winding) and a secondary coil (or winding). In fabrication, the primary coil is initially wound on a bobbin, and the secondary coil is then wound on the bobbin. Alternatively, the secondary coil is initially wound on the bobbin, and the primary coil is then wound on the bobbin. However, production of the transformer is time consuming and needs much working time.

A conventional composite or detachable transformer was disclosed in the Taiwanese Patent Publication No. 1575542, and comprises a primary coil mounted on a primary wire bracket and a secondary coil mounted on a secondary wire bracket. The primary wire bracket and the secondary wire bracket are then assembled together to form the composite transformer. However, such a conventional composite transformer has the following deficiencies:

1. The auxiliary coil is mounted on the primary wire bracket, thereby easily causing an unsteady state of the power supply. Besides, when the wire end of the auxiliary coil is corrected to a metal leg, the wire end straddles the secondary coil and produces signal interference so that the power supply is more unsteady.

2. The bottom of the primary wire bracket is a gate-shaped structure. After the secondary side wire bracket is combined with the primary side wire bracket, the creepage distance will not increase, and there is a small distance at the junction of the two wire brackets, thereby decreasing the insulation effect.

3. The primary side bobbin and the secondary side bobbin have corresponding metal pins respectively. For example, the metal pins of the primary side bobbin are arranged in a row on the left side of the transformer, and the metal pins of the secondary side bobbin are arranged in a row on the right side of the transformer. The metal pins of the secondary side bobbin also include outlet metal pins of the auxiliary coil, and the metal pins of the auxiliary coil and the secondary coil have different thickness, so that it is necessary to set multiple metal pins.

Another conventional transformer was disclosed in the Taiwanese Patent Publication No. 1463508, to enhance the insulating effect of the transformer. However, such a conventional transformer still has the following deficiencies:

1. The structure of the insulating shell is too complicated. Although the insulating shell has a good insulation effect, the structure of the insulating shell has a smaller volume and a lighter weight to conform to the structure of the present transformer, so that the insulating shell has a complicated construction. Moreover, combination of the insulating shell and the wire frame takes up a considerable amount of space, which limits the wire winding area.

2. The circuit board has a smaller area. In such a conventional transformer, the pins of the transformer are arranged in two rows in parallel on two sides of the transformer. It can be clearly seen that the width of the two rows of pins is larger than that of the transformer. It is because the circuit board has many pin holes, and there are copper foils around the pin holes. The copper foils have corresponding lines. In terms of safety requirements, there are certain restrictions on the distance between each pin hole and each copper foil. Thus, the width of the two rows of pins is larger than that of the transformer. Therefore, reduction in the volume of the transformer cannot satisfy the requirement of the safety distance of the circuit board.

Another conventional combination transformer was disclosed in the Taiwanese Patent Publication No. 1695393, and comprises a secondary side bobbin having a first wire slot having a bottom provided with a first wire holder and a second wire holder. The second wire holder is provided with auxiliary pins and connecting grooves. A secondary coil is wound in the first wire slot and has a first outlet end extending to the first wire holder and a second outlet end extending to the second wire holder and connected to the auxiliary pins. A primary side bobbin has a second wire slot and has a bottom provided with a wire guiding plate and a third wire holder. A primary coil is wound in the second wire slot and has a third outlet end extending along the wire guiding plate to the third wire holder and connected to the inlet pins.

However, the bottom of the primary side bobbin has a wire guiding plate and a third wire holder, so that the second wire holder of the secondary side bobbin has to provide the connecting grooves, thereby complicating the procedures for producing the primary side bobbin and the secondary side bobbin. In addition, combination of the pins of the second wire holder and the third wire holder limits the position of the wire ends of the primary coil and secondary coil, thereby restricting the layout of the circuit board.

BRIEF SUMMARY OF THE INVENTION

The primary objective of the present invention is to provide a resonant transformer structure that simplifies the procedure of production.

The secondary objective of the present invention is to provide a resonant transformer structure that reduces mutual interference of the wire ends of a primary winding and a secondary winding.

A further objective of the present invention is to provide a resonant transformer structure that increases a creepage distance between a primary side and a secondary side.

A further objective of the present invention is to provide a resonant transformer structure that simplifies a wire layout of a circuit board.

In accordance with the present invention, there is provided a resonant transformer structure comprising a secondary wire bracket, a secondary winding, a primary wire bracket, and a primary winding. The secondary wire bracket has a hollow interior. The secondary wire bracket has a bottom provided with a bottom plate and a top provided with a receiving seat. The secondary wire bracket has a secondary wire groove defined between the bottom plate and the receiving seat. The bottom plate has a first end provided with a first wire holder and a second end provided with a second wire holder. The receiving seat has a first end provided with an opening. The receiving seat is provided with two third wire holders extending from two sides of the opening. Each of the two third wire holders is provided with a plurality of auxiliary legs spaced from each other. The secondary winding is wound in the secondary wire groove. The secondary winding has a first wire end extending outward and a second wire end extending outward. The first wire end extends into the first wire holder. The second wire end extends into the two third wire holders and is connected to the auxiliary legs. The primary wire bracket has a hollow interior. The primary wire bracket has a top provided with an upper plate and a bottom provided with a lower plate. The primary wire bracket has a primary wire groove defined between the upper plate and the lower plate. The upper plate has an end provided with a fourth wire holder. The fourth wire holder is provided with a plurality of connecting legs spaced from each other. The primary wire bracket is provided with a dividing plate arranged in the primary wire groove. The dividing plate is provided with a plurality of jump wire gaps corresponding to the fourth wire holder. The primary winding is wound in the primary wire groove. The primary winding has a third wire end extending outward. The third wire end extends through the jump wire gaps and is connected to the connecting legs. The secondary wire bracket is wound by the secondary winding and assembled with the auxiliary legs of each of the two third wire holders, while the primary wire bracket is wound by the primary winding and assembled with the connecting legs of the fourth wire holder. The primary wire bracket extends through the opening of the receiving seat into the secondary wire bracket. A path of the second wire end connected to the auxiliary legs does not pass the primary winding. The third wire end extends through the jump wire gaps, and is connected to the connecting legs to increase a distance between the third wire end and the primary winding. The resonant transformer structure increases a creepage distance, reduces a circuit interference between the secondary winding and the primary winding, and simplifies a procedure of production.

Preferably, the first wire holder of the secondary wire bracket is provided with a plurality of wire passages spaced from each other. Each of the wire passages is provided with a channel. The first wire end of the secondary winding extends into the wire passages of the first wire holder. The wire passages are spaced from each other to increase a creepage distance, and the first wire end of the secondary winding is assembled into the wire passages of the first wire holder quickly.

Preferably, the second wire holder is provided with a plurality of first leg supports spaced from each other. The second wire holder is provided with a plurality of fixed poles arranged on the first leg supports. The first leg supports are spaced from each other, to reduce a weight, and to increase a creepage distance. The resonant transformer structure is affixed to a preset circuit board.

Preferably, each of the two third wire holders is provided with a plurality of second leg supports spaced from each other. the auxiliary legs are arranged on the second leg supports and extend outward. The second leg supports are spaced from each other, to reduce a weight, and to increase a creepage distance.

Preferably, the receiving seat has two sidewalls. Each of the two sidewalls has a top provided with a top plate. The receiving seat is provided with two baffles each arranged on the top plate and each of the two sidewalls and each located adjacent to each of the two third wire holders. Each of the two baffles is provided with a reinforcing portion extending toward each of the two third wire holders to reinforce a mechanic strength when the auxiliary legs are mounted.

Preferably, the receiving seat is provided with a positioning slot defined between the two sidewalls and directed toward the opening. The fourth wire holder of the primary wire bracket is provided with a positioning portion opposite to the connecting legs. The positioning portion of the fourth wire holder is positioned in the positioning slot of the receiving seat after the primary wire bracket is mounted in the secondary wire bracket, to prevent a deviation during assembly, and to increase a creepage distance.

Preferably, the receiving seat has a second end provided with a stop portion. The stop portion has an outside formed with an insulating groove. The lower plate of the primary wire bracket rests on the stop portion of the receiving seat after the primary wire bracket is mounted in the secondary wire bracket, to prevent a deviation during assembly, and to increase a creepage distance.

Preferably, the fourth wire holder is provided with a plurality of support posts. The connecting legs and the support posts extend in the same direction. An end face of the support posts and an end face of the second wire holder share the same plane.

Preferably, each of the two third wire holders has a top provided with an extension extending outward. The extension is provided with the auxiliary legs and perpendicular to each of the two third wire holders. The primary wire bracket is provided with two recessed portions each defined between the upper plate and the fourth wire holder. The extension of each of the two third wire holders is mounted in each of the two recessed portions when the primary wire bracket is mounted on the secondary wire bracket, to satisfy a layout of a circuit board.

Preferably, the resonant transformer structure further comprises two symmetric iron cores. Each of the two iron cores is provided with a middle pillar and two symmetric side pillars. The middle pillar is arranged between the two side pillars. The middle pillars of the two iron cores extend through the receiving seat, the primary wire bracket, and the secondary wire bracket, and contact each other in the secondary wire bracket, while the two side pillars of the two iron cores surround the secondary wire bracket and contact each other. The two iron cores produce a magnetic circuit passing through the primary winding and the secondary winding.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
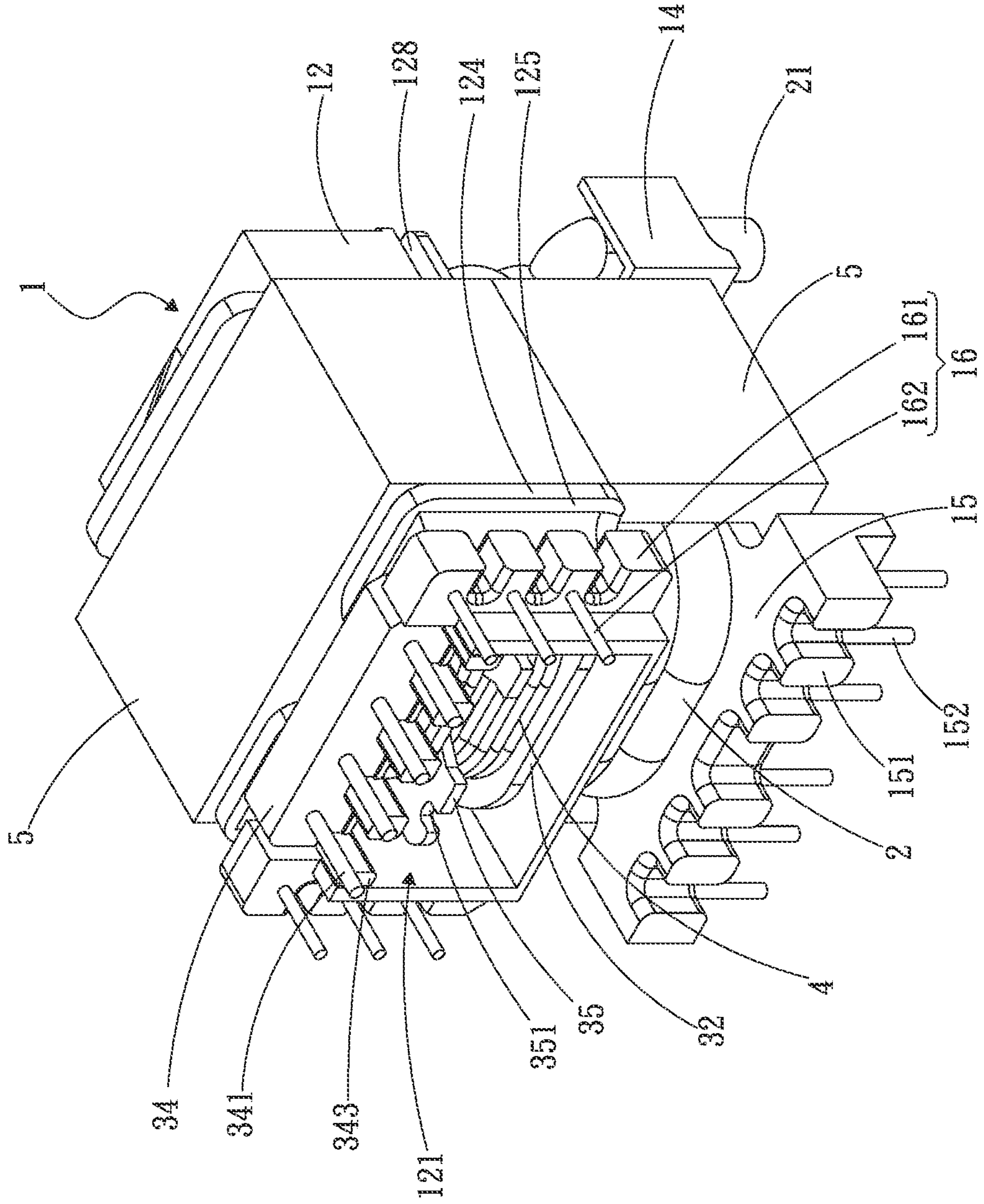
FIG. 1 is a perspective view of a resonant transformer structure in accordance with the preferred embodiment of the present invention.

Referring to the drawings and initially to FIGS. 1-5, a resonant transformer structure in accordance with the preferred embodiment of the present invention comprises a secondary wire bracket (or bobbin or frame) 1, a secondary winding (or coil) 2, a primary wire bracket (or bobbin or frame) 3, a primary winding (or coil) 4, and two symmetric iron cores 5.

The secondary wire bracket 1 has a hollow interior. The secondary wire bracket 1 has a bottom provided with a bottom plate 11 and a top provided with a receiving seat 12. The secondary wire bracket 1 has a secondary wire groove 13 defined between the bottom plate 11 and the receiving seat 12. The bottom plate 11 has a first end provided with a first wire holder 14 and a second end provided with a second wire holder 15. The first wire holder 14 is provided with a plurality of wire passages 141 spaced from each other. Each of the wire passages 141 has a side provided with a channel 142. The second wire holder 15 is provided with a plurality of first leg supports 151 spaced from each other. The second wire holder 15 is provided with a plurality of fixed poles 152 arranged on the first leg supports 151 and extending outward.

The receiving seat 12 has a first end provided with an opening 121. The receiving seat 12 has two sidewalls 122. Each of the two sidewalls 122 has a top provided with a top plate 123. The receiving seat 12 is provided with two third wire holders 16 extending from two sides of the opening 121. Each of the two third wire holders 16 is provided with a plurality of second leg supports 161 spaced from each other. Each of the two third wire holders 16 is provided with a plurality of auxiliary legs 162 arranged on the second leg supports 161 and extending outward. The receiving seat 12 is provided with two baffles 124 each arranged on the top plate 123 and each of the two sidewalls 122 and each located adjacent to each of the two third wire holders 16. Each of the two baffles 124 is provided with a reinforcing portion 125 extending toward each of the two third wire holders 16. The receiving seat 12 is provided with a positioning slot 126 defined between the two sidewalls 122 and directed toward the opening 121. The receiving seat 12 has a second end provided with a stop portion 127. The stop portion 127 has an outside formed with an insulating groove 128.

The secondary winding 2 has a first wire end 21 extending outward and a second wire end 22 extending outward.

The primary wire bracket 3 has a hollow interior. The primary wire bracket 3 has a top provided with an upper plate 31 and a bottom provided with a lower plate 32. The primary wire bracket 3 has a primary wire groove 33 defined between the upper plate 31 and the lower plate 32. The upper plate 31 has an end provided with a fourth wire holder 34. The fourth wire holder 34 is to provided with a plurality of connecting legs 341 spaced from each other. The fourth wire holder 34 is provided with a plurality of support posts 343. The connecting legs 341 and the support posts 343 extend in the same direction. The fourth wire holder 34 is provided with a positioning portion 342 opposite to the connecting legs 341. The primary wire bracket 3 is provided with a dividing plate 35 arranged in the primary wire groove 33. The dividing plate 35 is provided with a plurality of jump wire gaps 351 corresponding to the fourth wire holder 34. The dividing plate 35 is provided with a plurality of cutouts 352.

The primary winding 4 has a third wire end 41 extending outward.

Each of the two iron cores 5 is provided with a middle pillar 51 and two symmetric side pillars 52. The middle pillar 51 is arranged between the two side pillars 52.

In assembly, the secondary wire bracket 1 and the primary wire bracket 3 are wound by the secondary winding 2 and the primary winding 4 respectively, and are assembled with the auxiliary legs 162 of the two third wire holders 16 respectively.

Figure 2:
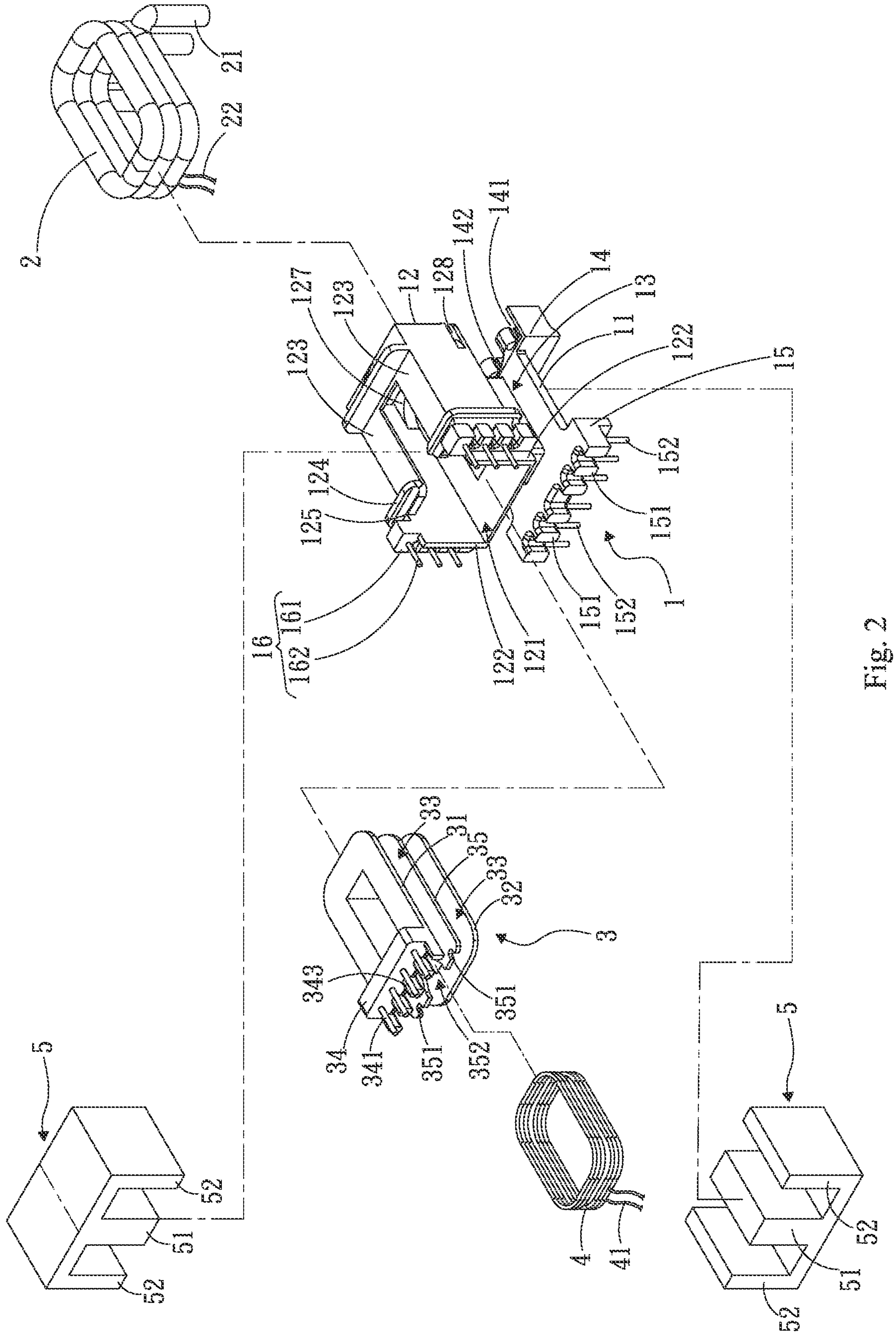
FIG. 2 is an exploded perspective view of the resonant transformer structure in accordance with the preferred embodiment of the present invention.
Figure 3:
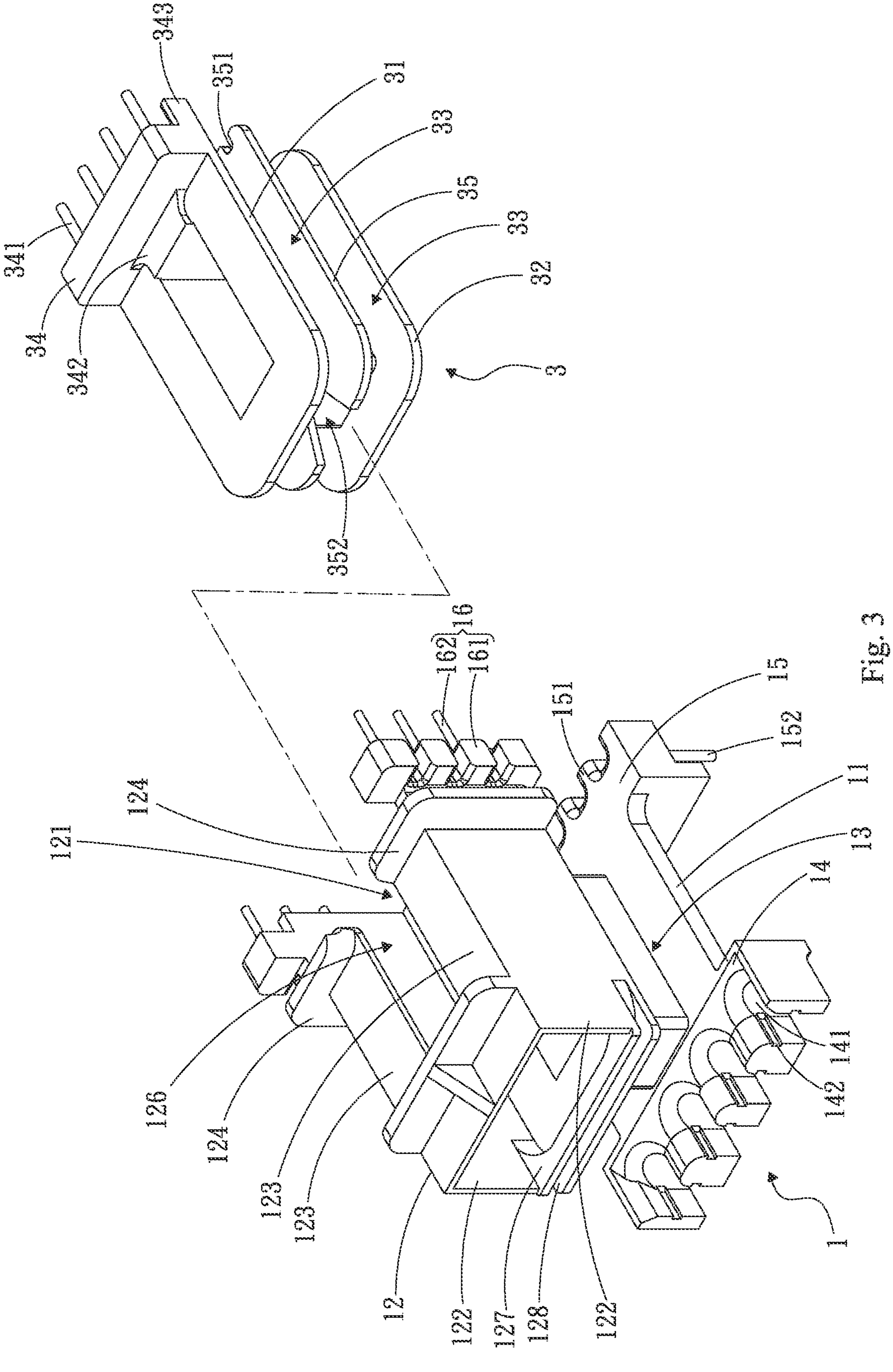
FIG. 3 is a partial exploded perspective view of the resonant transformer structure in accordance with the preferred embodiment of the present invention.
Figure 4:
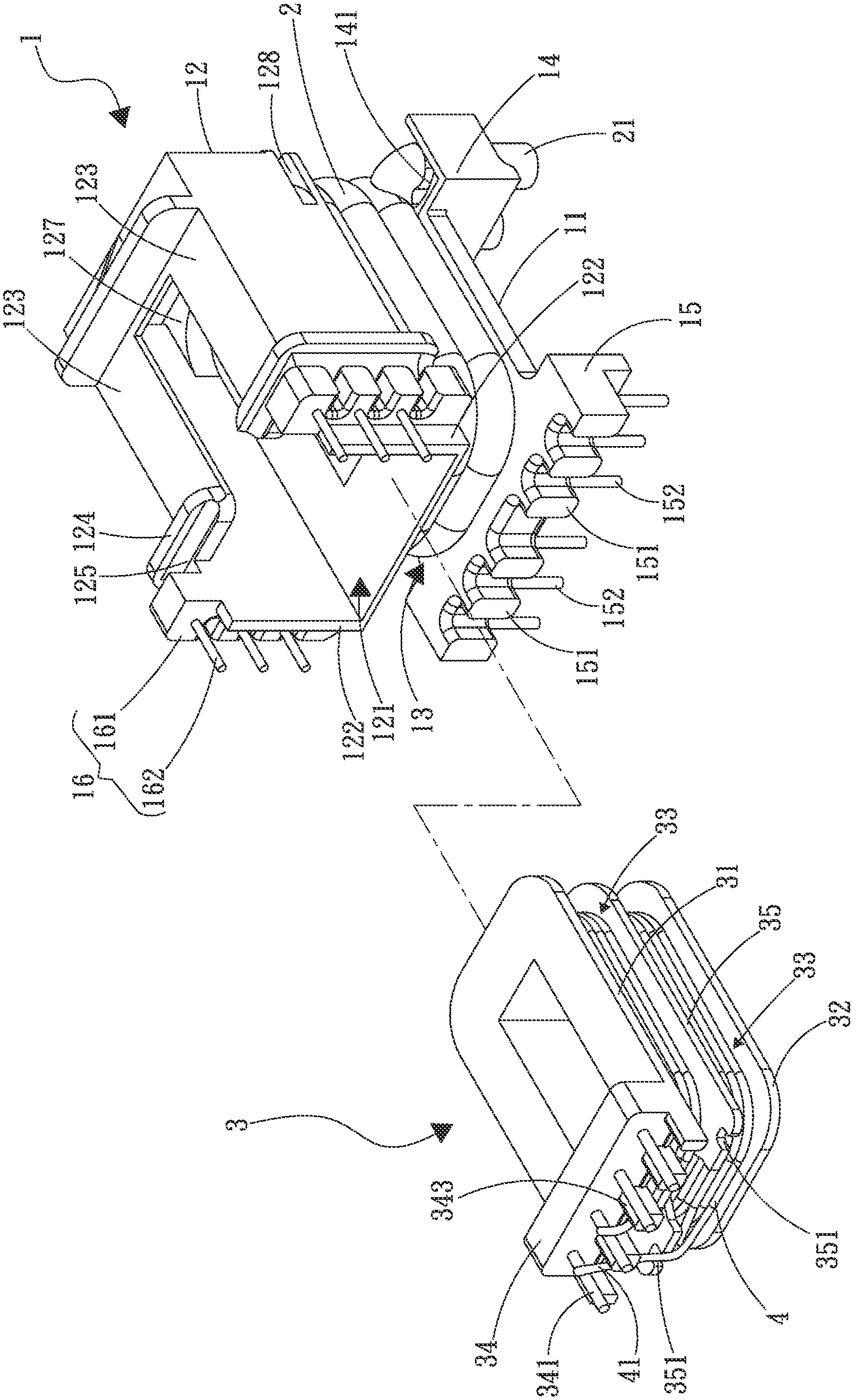
FIG. 4 is another partial exploded perspective view of the resonant transformer structure in accordance with the preferred embodiment of the present invention.

Referring to FIG. 4 with reference to FIGS. 1-3, the secondary wire bracket 1 and the secondary winding 2 are assembled as follows. The fixed poles 152 are arranged on the first leg supports 151 of the second wire holder 15, and the auxiliary legs 162 are arranged on the second leg supports 161 of each of the two third wire holders 16. It is appreciated that, when the auxiliary legs 162 are arranged, each of the two baffles 124 and the reinforcing portion 125 reinforce the mechanic strength of the two third wire holders 16 and the second leg supports 161 to increase the quality in production. After the secondary wire bracket 1 is provided with the fixed poles 152 and the auxiliary legs 162, the secondary winding 2 is wound in the secondary wire groove 13. At this time, the first wire end 21 extends into the wire passages 141 of the first wire holder 14, and the second wire end 22 extends into the two third wire holders 16 and is connected to the auxiliary legs 162. It is appreciated that, the first leg supports 151 are spaced from each other, and the second leg supports 161 are spaced from each other, to reduce the weight, and to increase the creepage distance. Thus, the first wire end 21 is assembled into the wire passages 141 quickly.

Again referring to FIG. 4 with reference to FIGS. 1-3, the primary wire bracket 3 and the primary winding 4 are assembled as follows. After the fourth wire holder 34 is provided with the connecting legs 341, the primary winding 4 is wound in the primary wire groove 33. At this time, the third wire end 41 extends through the jump wire gaps 351 and is connected to the connecting legs 341. In such a manner, after the third wire end 41 extends through the jump wire gaps 351, the path of the third wire end 41 connected to the connecting legs 341 is expanded outward and distant from the primary winding 4 in the primary wire groove 33, to reduce a signal interference or interruption.

Figure 5:
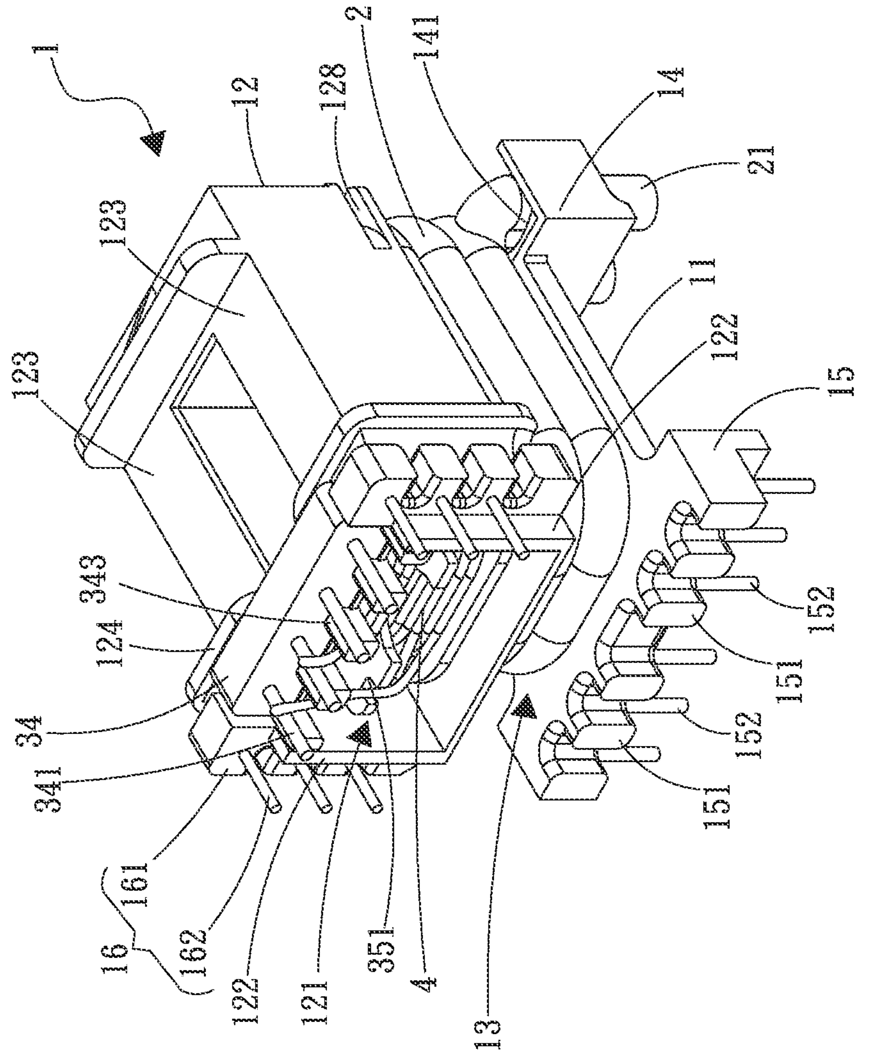
FIG. 5 is a partial perspective assembly view of the resonant transformer structure in accordance with the preferred embodiment of the present invention.

Referring to FIG. 5 with reference to FIGS. 1-4, the secondary wire bracket 1, the primary wire bracket 3, and the two iron cores 5 are assembled as follows. It is clear that, the secondary wire bracket 1 and the primary wire bracket 3 are erected individually, to reduce the procedure of production. Thus, the secondary winding 2 is wound around the secondary wire bracket 1, and the primary winding 4 is wound around the primary wire bracket 3. The primary wire bracket 3 extends through the opening 121 of the receiving seat 12 into the secondary wire bracket 1 so that the primary wire bracket 3 is mounted in the secondary wire bracket 1. At this time, the positioning portion 342 of the fourth wire holder 34 is positioned in the positioning slot 126 of the receiving seat 12, and the lower plate 32 of the primary wire bracket 3 rests on the stop portion 127 of the receiving seat 12, to prevent a deviation during assembly, and to increase the creepage distance. At the same time, an end face of the support posts 343 of the fourth wire holder 34 and an end face of the second wire holder 15 share the same plane, so that when the resonant transformer structure is mounted on a circuit board vertically, the end face of the support posts 343 of the fourth wire holder 34 and the end face of the second wire holder 15 rest on the circuit board to present a horizontal arrangement. After the secondary wire bracket 1 and the primary wire bracket 3 are combined together, the middle pillars 51 of the two iron cores 5 extend through the receiving seat 12, the primary wire bracket 3, and the secondary wire bracket 1, and contact each other in the secondary wire bracket 1, while the two side pillars 52 of the two iron cores 5 surround the secondary wire bracket 1 and contact each other. Thus, the two iron cores 5 produce a magnetic circuit passing through the primary winding 4 and the secondary winding 2.

It is appreciated that, the second leg supports 161 of the two third wire holders 16 are arranged at the two sides of the opening 121 of the secondary wire bracket 1. Thus, when the second wire end 22 is to be connected to the auxiliary legs 162, the second wire end 22 will not pass the opening 121. The second wire end 22 is stretched in a spacing between the second leg supports 161 and the two baffles 124. After the second wire end 22 passes a spacing between the second leg supports 161, the second wire end 22 is connected to the auxiliary legs 162. Alternatively, the second wire end 22 is stretched in the secondary wire groove 13 to each of the second leg supports 161, and is connected to the auxiliary legs 162. Thus, after the primary wire bracket 3 is mounted in the opening 121 of the secondary wire bracket 1, the second wire end 22 will not pass the primary wire bracket 3, to prevent a signal interference or interruption between the primary winding 4 and the secondary winding 2. It is appreciated that, the path of the second wire end 22 connected to the auxiliary legs 162 is designed to avoid the primary wire bracket 3 to prevent a signal interference or interruption.

Figure 6:
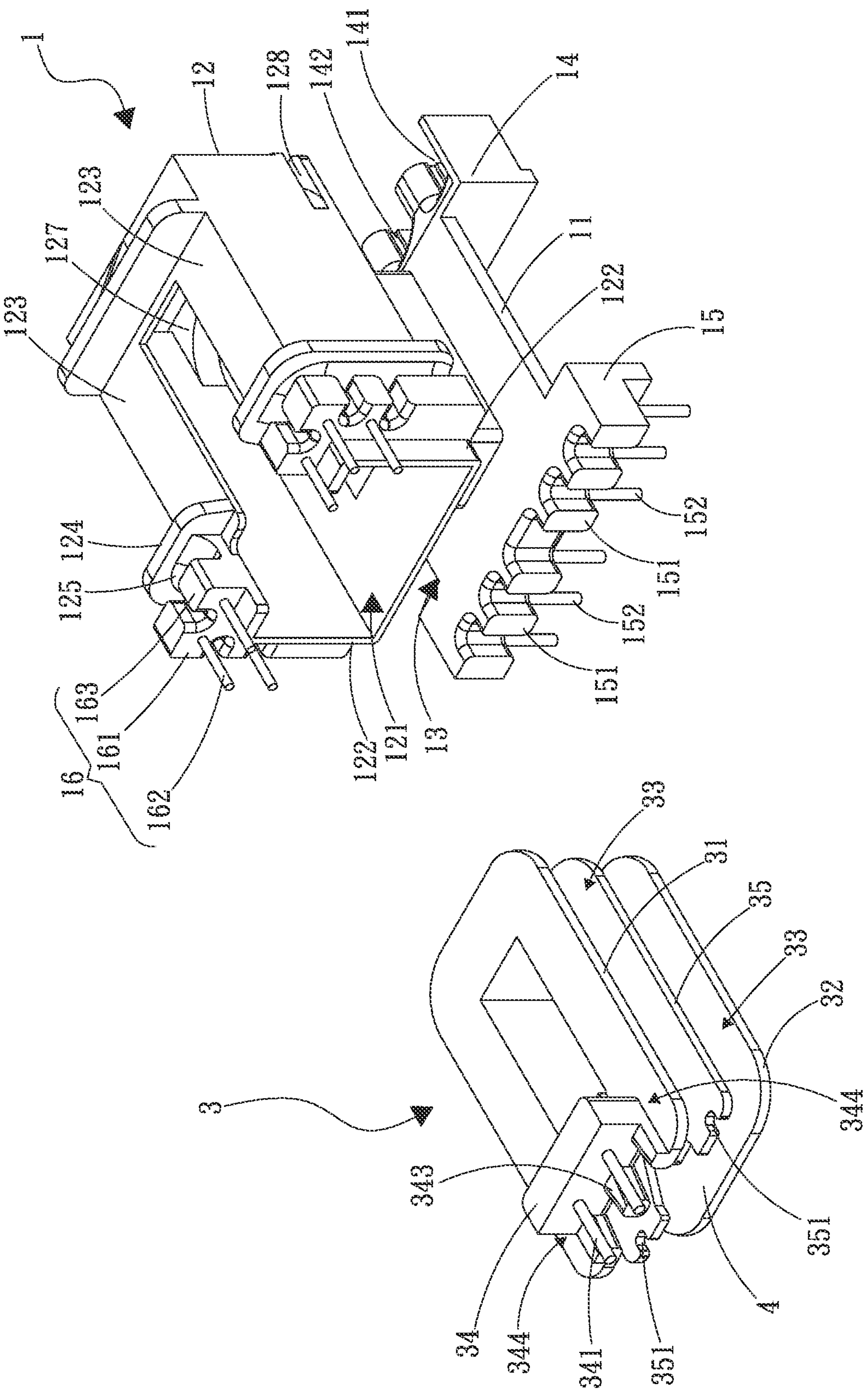
FIG. 6 is a partial exploded perspective view of a resonant transformer structure in accordance with another preferred embodiment of the present invention.

Referring to FIG. 6, each of the two third wire holders 16 has a top provided with an extension 163 extending outward. The extension 163 is provided with the auxiliary legs 162 and perpendicular to each of the two third wire holders 16. The primary wire bracket 3 is provided with two recessed portions 344 each defined between the upper plate 31 and the fourth wire holder 34. The extension 163 of each of the two third wire holders 16 is mounted in each of the two recessed portions 344 when the primary wire bracket 3 is mounted on the secondary wire bracket 1, to satisfy a layout of a printed circuit board (PCB).

Accordingly, the secondary wire bracket 1 is wound by the secondary winding 2 and assembled with the auxiliary legs 162 of each of the two third wire holders 16, while the primary wire bracket 3 is wound by the primary winding 4 and assembled with the connecting legs 341 of the fourth wire holder 34. Then, the primary wire bracket 3 extends through the opening 121 of the receiving seat 12 into the secondary wire bracket 1 so that the primary wire bracket 3 is mounted in the secondary wire bracket 1. The path of the second wire end 22 connected to the auxiliary legs 162 will not pass the primary winding 4. The third wire end 41 extends through the jump wire gaps 351, and is connected to the connecting legs 341 to increase the distance between the third wire end 41 and the prim winding 4. Thus, the resonant transformer structure increases the creepage distance, reduces a circuit interference or interruption between the secondary winding 2 and the primary winding 4, and simplifies the procedure of production.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A resonant transformer structure comprising:

a secondary wire bracket, a secondary winding, a primary wire bracket, and a primary winding;

wherein:

the secondary wire bracket has a hollow interior;

the secondary wire bracket has a bottom provided with a bottom plate and a top provided with a receiving seat;

the secondary wire bracket has a secondary wire groove defined between the bottom plate and the receiving seat;

the bottom plate has a first end provided with a first wire holder and a second end provided with a second wire holder;

the receiving seat has a first end provided with an opening;

the receiving seat is provided with two third wire holders extending from two sides of the opening;

each of the two third wire holders is provided with a plurality of auxiliary legs spaced from each other;

the secondary winding is wound in the secondary wire groove;

the secondary winding has a first wire end extending outward and a second wire end extending outward;

the first wire end extends into the first wire holder;

the second wire end extends into the two third wire holders and is connected to the auxiliary legs;

the primary wire bracket has a hollow interior;

the primary wire bracket has a top provided with an upper plate and a bottom provided with a lower plate;

the primary wire bracket has a primary wire groove defined between the upper plate and the lower plate;

the upper plate has an end provided with a fourth wire holder;

the fourth wire holder is provided with a plurality of connecting legs spaced from each other;

the primary wire bracket is provided with a dividing plate arranged in the primary wire groove;

the dividing plate is provided with a plurality of jump wire gaps corresponding to the fourth wire holder;

the primary winding is wound in the primary wire groove;

the primary winding has a third wire end extending outward;

the third wire end extends through the jump wire gaps and is connected to the connecting legs;

the secondary wire bracket is wound by the secondary winding and assembled with the auxiliary legs of each of the two third wire holders, while the primary wire bracket is wound by the primary winding and assembled with the connecting legs of the fourth wire holder;

the primary wire bracket extends through the opening of the receiving seat into the secondary wire bracket;

a path of the second wire end connected to the auxiliary legs does not pass the primary winding;

the third wire end extends through the jump wire gaps, and is connected to the connecting legs to increase a distance between the third wire end and the primary winding; and the resonant transformer structure increases a creepage distance, reduces a circuit interference between the secondary winding and the primary winding, and simplifies a procedure of production.

2. The resonant transformer structure as claimed in claim 1, wherein:

the first wire holder of the secondary wire bracket is provided with a plurality of wire passages spaced from each other;

each of the wire passages is provided with a channel;

the first wire end of the secondary winding extends into the wire passages of the first wire holder;

the wire passages are spaced from each other to increase a creepage distance; and the first wire end of the secondary winding is assembled into the wire passages of the first wire holder quickly.

3. The resonant transformer structure as claimed in claim 1, wherein:

the second wire holder is provided with a plurality of first leg supports spaced from each other;

the second wire holder is provided with a plurality of fixed poles arranged on the first leg supports;

the first leg supports are spaced from each other, to reduce a weight, and to increase a creepage distance; and the resonant transformer structure is affixed to a preset circuit board.

4. The resonant transformer structure as claimed in claim 1, wherein:

each of the two third wire holders is provided with a plurality of second leg supports spaced from each other;

the auxiliary legs are arranged on the second leg supports and extend outward; and the second leg supports are spaced from each other, to reduce a weight, and to increase a creepage distance.

5. The resonant transformer structure as claimed in claim 1, wherein:

the receiving seat has two sidewalls;

each of the two sidewalls has a top provided with a top plate;

the receiving seat is provided with two baffles each arranged on the top plate and each of the two sidewalls and each located adjacent to each of the two third wire holders; and each of the two baffles is provided with a reinforcing portion extending toward each of the two third wire holders to reinforce a mechanic strength when the auxiliary legs are mounted.

6. The resonant transformer structure as claimed in claim 1, wherein:

the receiving seat is provided with a positioning slot defined between the two sidewalls and directed toward the opening;

the fourth wire holder of the primary wire bracket is provided with a positioning portion opposite to the connecting legs; and the positioning portion of the fourth wire holder is positioned in the positioning slot of the receiving seat after the primary wire bracket is mounted in the secondary wire bracket, to prevent a deviation during assembly, and to increase a creepage distance.

7. The resonant transformer structure as claimed in claim 1, wherein:

the receiving seat has a second end provided with a stop portion;

the stop portion has an outside finned with an insulating groove; and the lower plate of the primary wire bracket rests on the stop portion of the receiving seat after the primary wire bracket is mounted in the secondary wire bracket, to prevent a deviation during assembly, and to increase a creepage distance.

8. The resonant transformer structure as claimed in claim 1, wherein:

the fourth wire holder is provided with a plurality of support posts;

the connecting legs and the support posts extend in the same direction; and an end face of the support posts and an end face of the second wire holder share the same plane.

9. The resonant transformer structure as claimed in claim 1, wherein:

each of the two third wire holders has a top provided with an extension extending outward;

the extension is provided with the auxiliary legs and perpendicular to each of the two third wire holders;

the primary wire bracket is provided with two recessed portions each defined between the upper plate and the fourth wire holder; and the extension of each of the two third wire holders is mounted in each of the two recessed portions when the primary wire bracket is mounted on the secondary wire bracket, to satisfy a layout of a circuit board.

10. The resonant transformer structure as claimed in claim 1, further comprising:

two symmetric iron cores;

wherein:

each of the two iron cores is provided with a middle pillar and two symmetric side pillars;

the middle pillar is arranged between the two side pillars;

the middle pillars of the two iron cores extend through the receiving seat, the primary wire bracket, and the secondary wire bracket, and contact each other in the secondary wire bracket, while the two side pillars of the two iron cores surround the secondary wire bracket and contact each other; and the two iron cores produce a magnetic circuit passing through the primary winding and the secondary winding.

* * * * *